United States Patent
Brooks

(10) Patent No.: US 11,306,800 B1
(45) Date of Patent: Apr. 19, 2022

(54) SPEED AND TORQUE OPTIMIZER FOR A DRIVE TRAIN

(71) Applicant: Eddie L Brooks, Summit, MS (US)

(72) Inventor: Eddie L Brooks, Summit, MS (US)

(73) Assignee: Timothy Holmes, New Orleans, LA (US)

( * ) Notice: Subject to any disclaimer, the term of this patent is extended or adjusted under 35 U.S.C. 154(b) by 0 days.

(21) Appl. No.: 16/282,483

(22) Filed: Feb. 22, 2019

Related U.S. Application Data

(63) Continuation-in-part of application No. 15/998,272, filed on Jul. 26, 2018, now abandoned.

(51) Int. Cl.
| | |
|---|---|
| *F16H 1/20* | (2006.01) |
| *F16H 57/02* | (2012.01) |
| *F16H 57/038* | (2012.01) |
| *F16H 37/04* | (2006.01) |
| *F16H 57/04* | (2010.01) |
| *F16H 57/021* | (2012.01) |

(52) U.S. Cl.
CPC ........... *F16H 1/203* (2013.01); *F16H 37/041* (2013.01); *F16H 57/021* (2013.01); *F16H 57/038* (2013.01); *F16H 57/0409* (2013.01); *F16H 57/0495* (2013.01)

(58) Field of Classification Search
CPC ... F16H 1/14; F16H 1/20; F16H 1/203; F16H 1/206; F16H 1/22; F16H 1/222; F16H 37/041; F16H 57/038; F16H 57/0409; F16H 57/0495; F16H 57/021; F16H 57/029
See application file for complete search history.

(56) References Cited

U.S. PATENT DOCUMENTS

| | | | | |
|---|---|---|---|---|
| 334,074 | A * | 1/1886 | Hoekstra | F16H 1/22 |
| | | | | 74/410 |
| 1,017,954 | A * | 2/1912 | Cake | F16H 48/08 |
| | | | | 475/225 |
| 3,213,700 | A * | 10/1965 | Brownyer | F16H 57/037 |
| | | | | 74/424 |

(Continued)

FOREIGN PATENT DOCUMENTS

FR 902817 A * 9/1945 ............. F16H 1/222

OTHER PUBLICATIONS

How Gear Ratios Work from https://science.howstuffworks.com/transport/engines-equipment/gear-ratio.htm.*

(Continued)

*Primary Examiner* — Adam D Rogers
(74) *Attorney, Agent, or Firm* — Kenneth L. Tolar

(57) ABSTRACT

A speed and torque optimizer for a drive train includes an input shaft coupled with a primary driver having a pinion gear thereon that engages an input ring gear. The input ring gear is affixed to a first end of a carrier shaft having an output ring gear on an opposing end. The output ring gear engages an output pinion gear mounted on an output shaft. The input ring gear is larger in diameter than the output ring gear and therefore has more teeth. Because the input and output ring gears are mounted on the same shaft, they rotate at the same speeds thereby rotating the output pinion gear at a faster speed than the input pinion gear. The intermeshing gear teeth have a predefined curvature, pitch diameter and length to further accomplish increased speed at the output shaft while minimizing torque loss.

10 Claims, 5 Drawing Sheets

(56) References Cited

U.S. PATENT DOCUMENTS

| | | | | |
|---|---|---|---|---|
| 5,501,636 A | * | 3/1996 | Janke | F16D 7/025 |
| | | | | 464/48 |
| 6,766,708 B2 | | 7/2004 | Brooks | |
| 6,813,972 B2 | * | 11/2004 | Guo | F16H 48/08 |
| | | | | 384/583 |
| 7,086,983 B2 | * | 8/2006 | Turner | F16C 19/548 |
| | | | | 475/220 |
| 7,115,059 B2 | * | 10/2006 | Petruska | F16H 57/037 |
| | | | | 475/230 |
| 7,435,008 B2 | * | 10/2008 | Kawaguchi | F16C 33/36 |
| | | | | 384/571 |
| 8,919,214 B2 | * | 12/2014 | Brooks | F16H 57/029 |
| | | | | 74/15.84 |
| 9,803,736 B2 | * | 10/2017 | Adragna | F16H 48/08 |
| 2014/0213409 A1 | * | 7/2014 | Yoon | B25J 9/1025 |
| | | | | 475/343 |

OTHER PUBLICATIONS

Gear Ratio Calculator from https://www.omnicalculator.com/physics/gear-ratio.*

* cited by examiner

SPEED AND TORQUE OPTIMIZER FOR A DRIVE TRAIN

CROSS REFERENCE TO RELATED APPLICATIONS

This application is a continuation-in-part of application Ser. No. 15/998,272 filed on Jul. 26, 2018, the specification of which is incorporated herein by reference.

BACKGROUND OF THE INVENTION

The present invention relates to a device for improving the efficiency of power-transfer systems in vehicles or other mechanical drives.

DESCRIPTION OF THE PRIOR ART

Most mechanical drives include gearing systems that convert a higher engine speed to a lower output speed. For example, vehicle engines operate at rotational speeds that are higher than ideal for starting, stopping or routine driving. A transmission converts the engine's higher rotational speed to a lower output speed to rotate a drive shaft at a slower speed while increasing torque. The transmission allows the vehicle to accelerate from rest to a maximum speed, while maintaining engine efficiency. Most transmissions have a preset range of gear ratios that are not always suitable for certain applications. Heavy-duty vehicles, such as pickup trucks and eighteen wheelers, are subjected to severe engine and transmission strain, excess fuel consumption and increased operating costs when the manufacturer's preset gear ratios are too high. Moreover, the efficiency of other vehicles can be improved when existing gear ratios are modified.

Often the efficiency of such mechanical drives can be improved by increasing output speed while minimizing any torque losses, as in the case with an overdrive. In addition to motor vehicles, other mechanical drives can benefit from increased output speed, such as but not limited to, an electric motor, a combustion engine, wind, pneumatic or hydro-powered turbines, an aircraft propeller, a blower, industrial equipment, chain saws, vacuum cleaners, domestic appliances and the like.

Accordingly, there is currently a need for a device that may be integrated with a mechanical drive or drive train that modifies the gear ratio between the engine and drive shafts, while minimizing torque losses. The present invention addresses this need by providing a device that is connected between a primary source of power and torque and a target drive shaft to increase the speed ratio without sacrificing torque.

SUMMARY OF THE INVENTION

The present invention relates to a speed and torque optimizer for a drive train including an input shaft for coupling with a primary driver having a pinion thereon that engages an input ring gear. The input ring gear is affixed to a first end of a carrier shaft having an output ring gear on an opposing end. The output ring gear engages an output pinion gear mounted on an output shaft. The input ring gear is larger in diameter than the output ring gear and therefore may have more teeth. Because the input and output ring gears are mounted on the same shaft, they rotate at the same speeds thereby rotating the output pinion gear at a faster speed than the input pinion gear. The intermeshing gear teeth have a predefined curvature, pitch diameter and length to further achieve increased speed at the output shaft while minimizing torque loss.

It is therefore an object of the present invention to provide a speed and torque optimizer that increases output speed with minimal impact on torque.

It is therefore another object of the present invention to provide a speed and torque optimizer having an adapter for operating offset input and output drive shafts.

It is yet another object of the present invention to provide a speed and torque optimizer that can easily reverse the direction of rotation of a given output shaft.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
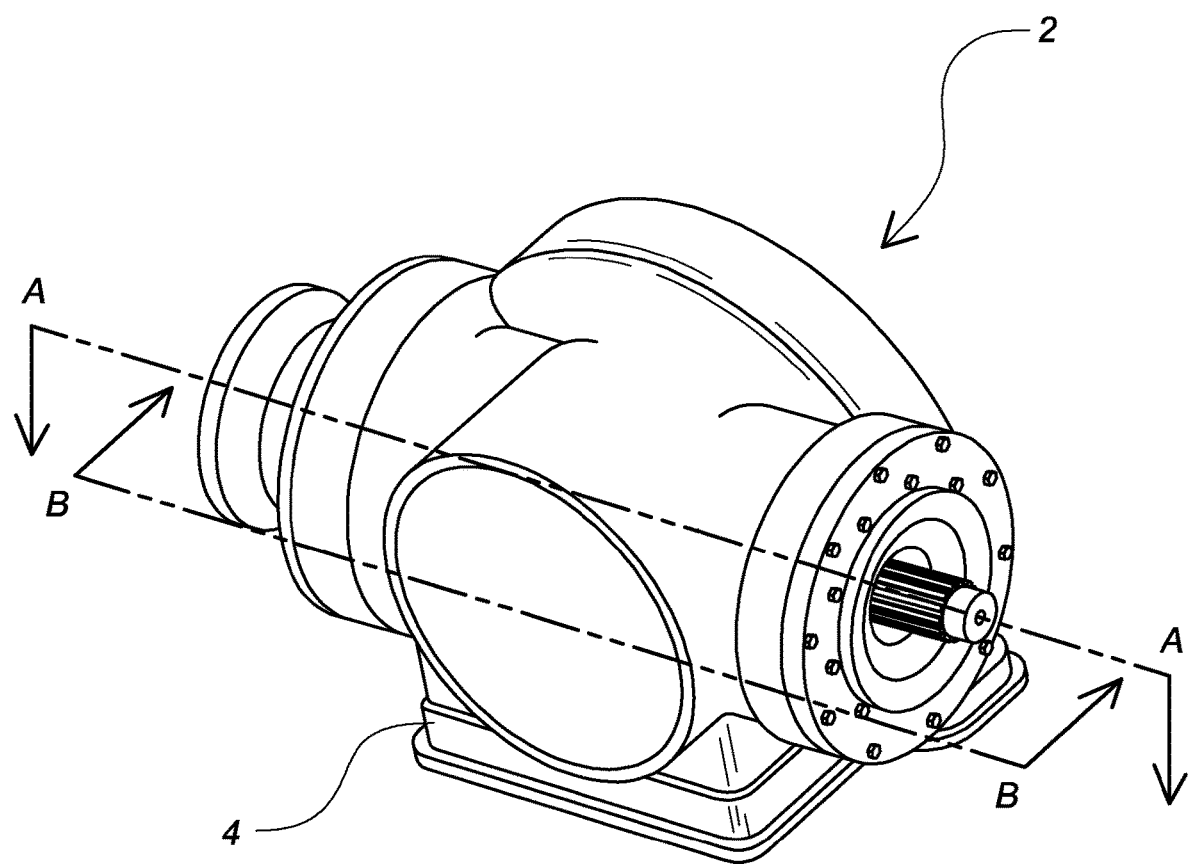
FIG. 1 is a perspective view of the device according to the present invention.
Figure 2:
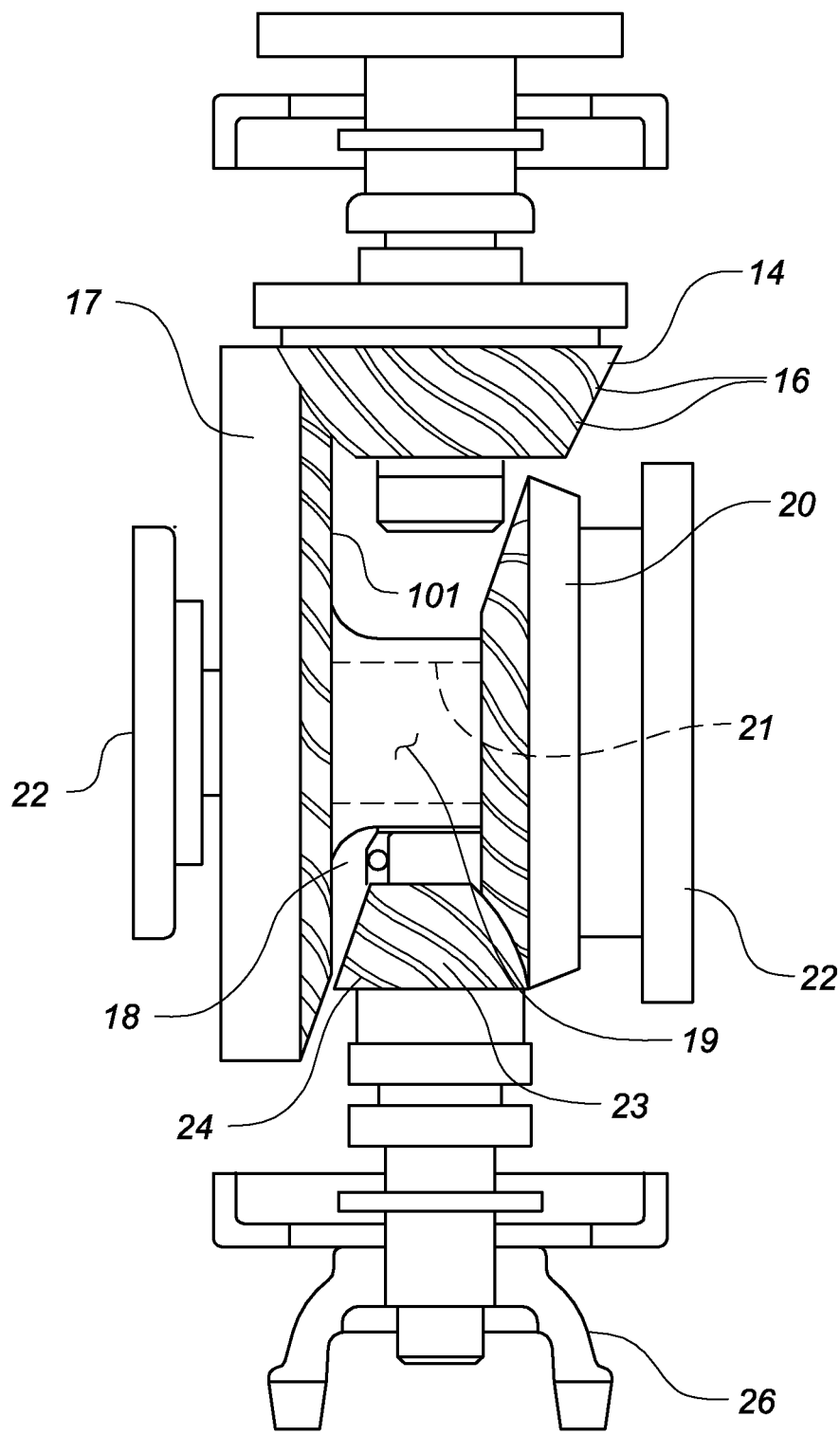
FIG. 2 is an isolated, side view of the primary internal components.
Figure 3:
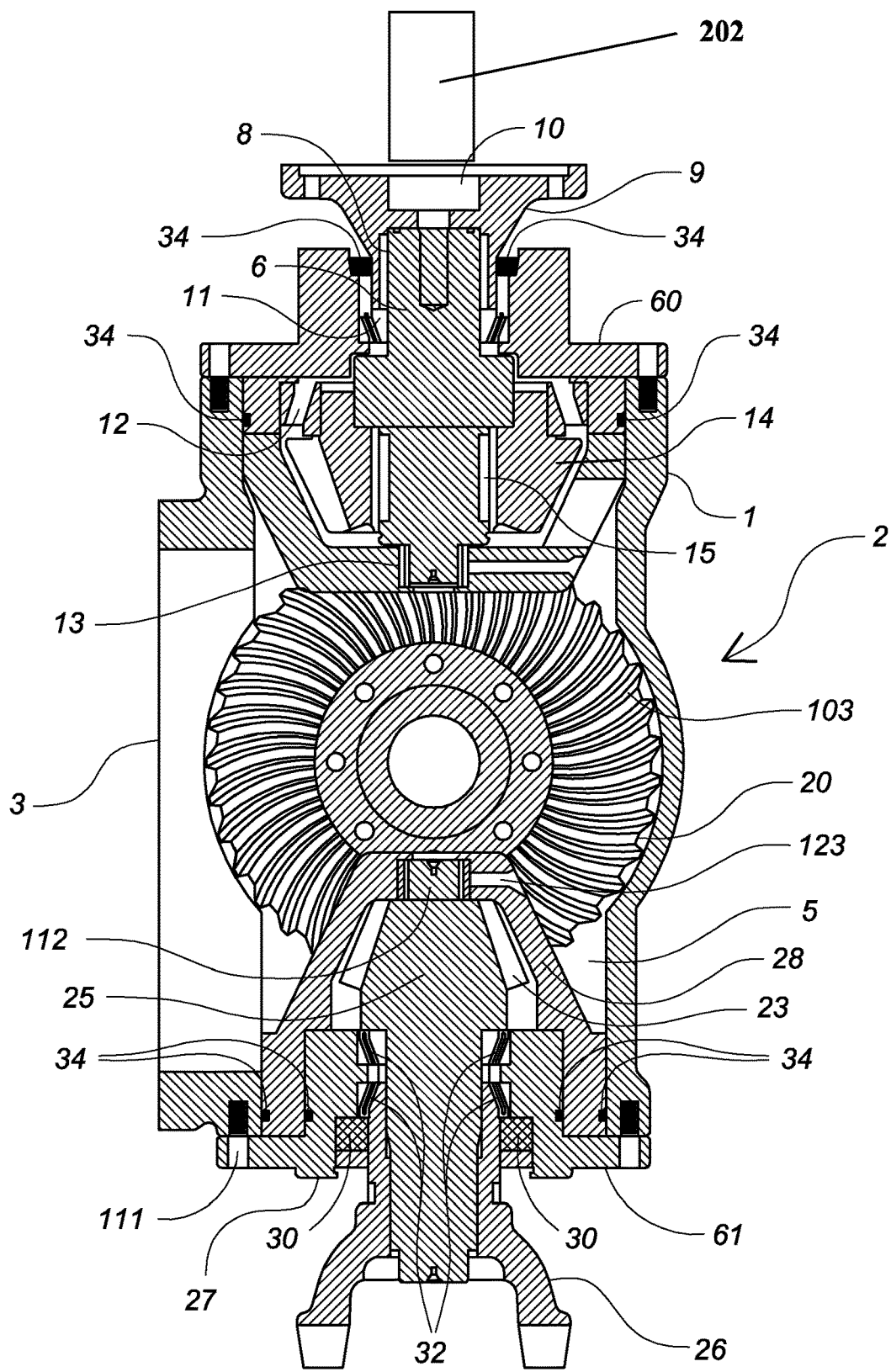
FIG. 3 is a vertical cross-sectional view of the housing taken along A-A of FIG. 1.

The present invention relates to a speed and torque optimizer for a drive train comprising a hollow housing 2 having a top wall 1, a removable bottom wall 3, a front wall 60, a rear wall 61, a plurality of sidewalls 4 and an interior chamber 5. The bottom wall may include apertures to provide cooling air to the interior chamber. As depicted in FIG. 1, the housing may be a unitary enclosure of any size or shape including contoured, rectangular, irregular, etc. The top wall 1 may also be removable to provide selective access to the interior components.

An opening on the front wall receives an input shaft 6 operably connected to a primary driver 202, such as the output shaft of a vehicle's transmission, a combustion engine, a blower motor or similar rotational driver. A flange 9 is connected to the primary driver, and also to the input shaft using a splined connection joint 8 and/or one or more bolts 10.

Received within the housing and secured to the distal end of the input shaft is an input pinion gear 14 having a predetermined diameter. The input pinion gear is likewise secured to the input shaft 6 with a splined connection 15. The input shaft 6 includes at least one outer bearing 1, one inner bearing 12 and one nipple bearing 13 that rigidly journal the pinion gear 14 in an optimal position and stabilize the input shaft against forces generated by the interacting components. The input pinion gear 14 includes a predetermined number of arcuate teeth 16 having a select width, length and pitch diameter. Adjacent to the input pinion ear is an input ring gear 17 having a geared surface 101 orthogonal to and engaging the input pinion gear teeth 16. The number of teeth, curvature and length of each tooth 101 are designed to achieve a desired speed ratio between the input pinion and input ring gears. Lube seals 34 prevent lubricant from escaping the housing.

Centrally positioned within the housing is a shaft assembly 18 extending from a sidewall to the opposing sidewall. The shaft assembly includes an outer carrier shaft 19 having two opposing ends that rotates about an intermediate shaft 21. The input ring gear 17 is attached to one end of the carrier shaft 19 while the opposing end of the carrier shaft includes an output ring gear 20 with arcuate teeth 103. In the preferred embodiment, the input ring gear 17 has a larger diameter than the output ring gear 20 to accommodate more and/or longer arcuate teeth for reasons that will be readily apparent to those skilled in the art. A first space formed between the first end of the carrier shaft 19 and the intermediate shaft 21 includes a pair of tapered bearings 203 received therein that are journaled between the carrier shaft and the intermediate shaft. A second space formed between the intermediate shaft and an output pinion gear 23, described infra, receives a singular set 204 of tapered bearings that are journaled between the output pinion gear 23 and the intermediate shaft 21. The intermediate shaft 21 and bearings 203, 204 structurally enhance the central portion of the housing and stabilize the carrier shaft even when subjected to substantial torque and recoil from the intermeshing components. A flange 22 at each end of the intermediate shaft houses the bearings and attaches the shaft assembly to the housing 2.

The output ring gear 20 rotatably engages the output pinion gear 23 which has a smaller diameter than the output ring gear. The output pinion gear 23 likewise includes a plurality of arcuate teeth 24 that intermesh with the arcuate teeth on the output ring gear 20. The number, curvature and pitch diameter of the teeth are designed relative to that of the other gear teeth to achieve a desired, increased rotational speed of the output pinion gear relative to the input pinion gear with minimal torque loss.

The output pinion gear 23 drives an output shaft 25 having a U-shaped turnbuckle 26 that is coupled with a target shaft, such as a propeller shaft, a vehicle drive shaft, a blower, etc. The output pinion gear 23 is partially protected within a casing including a first section 27 that encapsulates a set of bearings, lube seals 34 and the output shaft. The seals 34 prevent lubricant from escaping the casing. Preferably, the bearing set consists of ball bearings 30 and tapered bearings 32, though the bearing type can be varied. A second casing section 28 is fastened to the first section 27 and includes at least one nipple bearing 112. The first casing section 27 is securely fastened to the housing 2 with bolts 111 to further enhance the structural integrity of the interacting internal components. The second casing section 28 also includes an opening 123 that limits the amount of lube oil that contacts the nipple bearing and output pinion gear. Therefore, lubricant foaming is minimized and a larger nipple bearing can be used, which further stabilizes the pinion gear when exposed to the increased torque or speeds of the present invention. A lubricant pump and cooler (not pictured) mounted exteriorly of the housing along with a circuit of lubricant ports maintain the gears at a safe temperature while requiring less overall volume of lubricant. Therefore, the interior chamber of the housing need only be partially filled with lubricant, which minimizes any interference with gear rotation.

Figure 6:
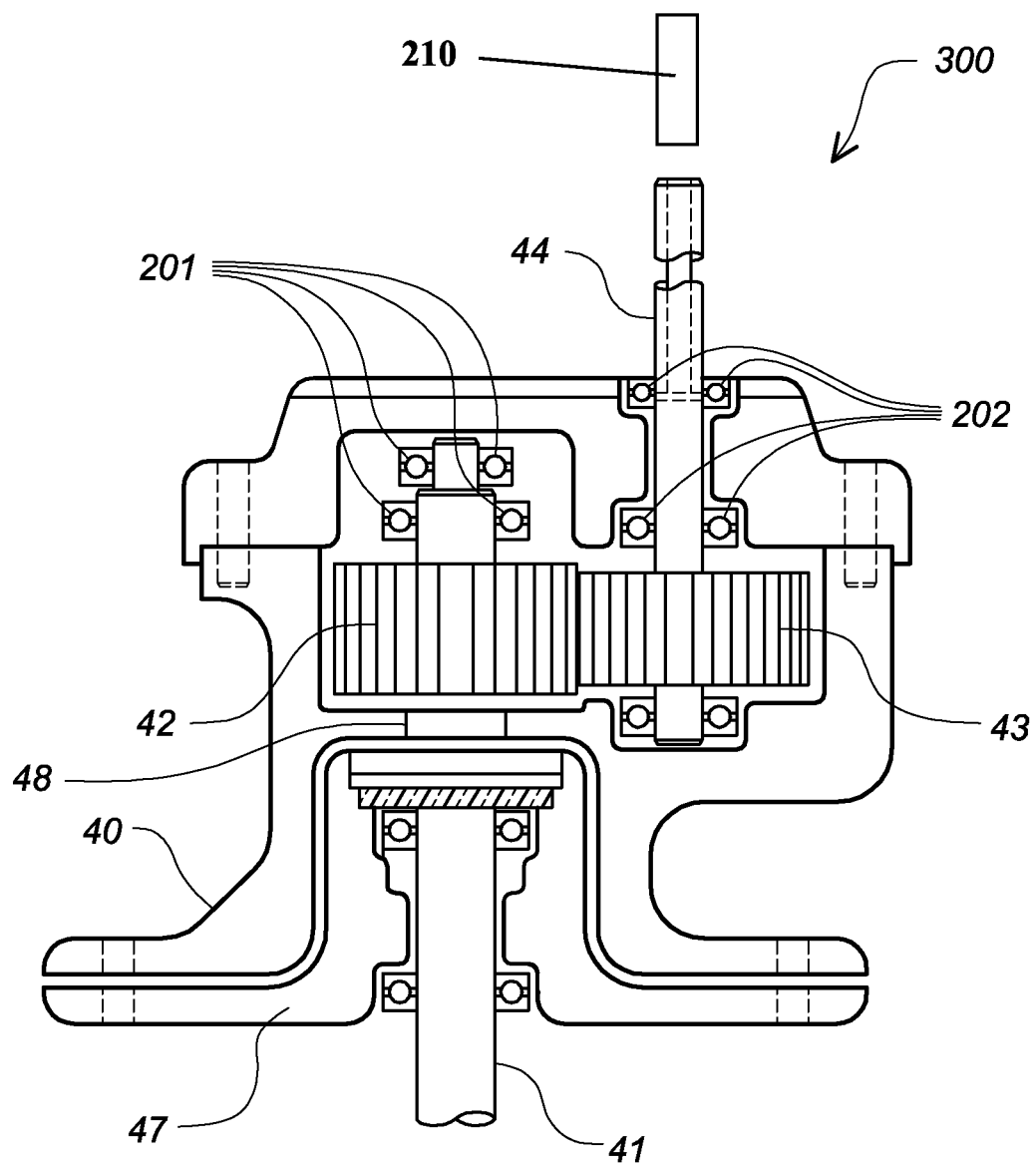
FIG. 6 depicts an adapter for use with the present invention.

Now referring to FIG. 6, the device may also include an adapter 300 that allows the device to be used with misaligned or offset input and drive shafts 210. To achieve optimal gear ratios in certain mechanical-drive applications, the interconnecting shafts must be offset to properly position the respective gears when available space is limited. The adapter includes a housing formed of an outer section 40 and a separable inner section 47. An output shaft 41 from another rotary driver, such as the foregoing embodiment, can be coupled with an input shaft 48 having an input gear 42 mounted thereon. The separable housing sections 40, 47 allow the auxiliary output shaft 41 to be easily coupled with the input shaft 48 while providing a sturdy protective enclosure for the internal components. The input gear 42 engages and drives an output gear 43 mounted on an output shaft 44. A plurality of bearings 201 provide a rigid support for the rotating input shaft 48 while assuring proper engagement of the input gear 42 and output gear 43. Likewise, the output shaft 44 is journaled on bearings 202 that maintain the output shaft in proper rotational alignment and the gears 42, 43 in proper engagement. Accordingly, rotation of the input shaft 48 drives the output shaft 44 on a different axis of rotation than the auxiliary output shaft 41. The adapter 300 can also be used to reverse the rotational direction of a drive shaft or propeller shaft and eliminate the need for a hanger bearing assembly, or to further modify a gear ratio applied to a target drive shaft.

Figures 4, 5:
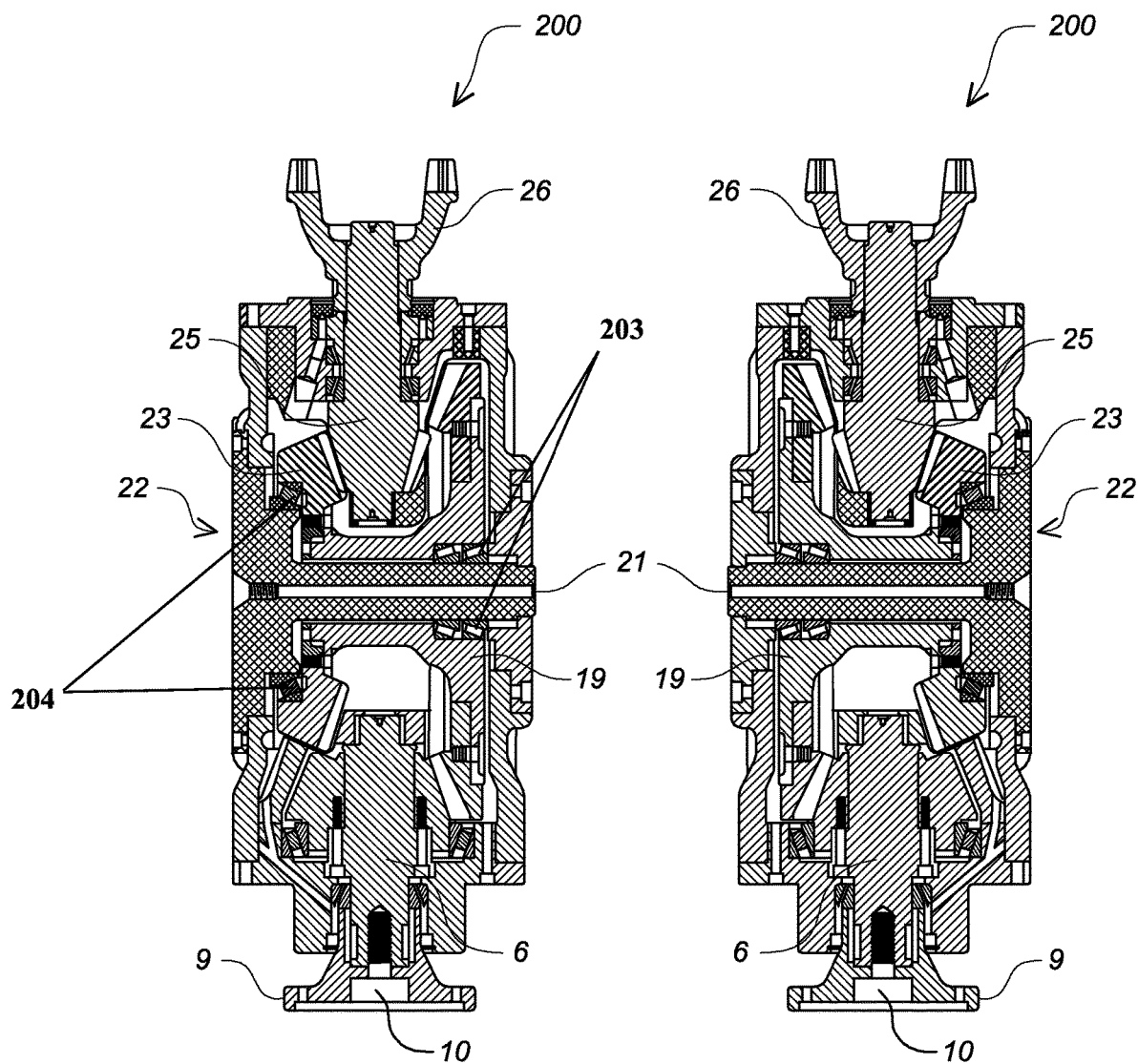
FIG. 4 is a horizontal cross-sectional view of the housing taken along B-B of FIG. 1.
FIG. 5 is a horizontal cross-sectional view of the housing taken along B-B of FIG. 1, depicting a mirrored-image version for reversing the output rotational direction.

As seen in FIGS. 4 and 5, a mirror image of the device can be used to reverse the direction of rotation of the output or drive shaft for certain applications. Furthermore, the mirrored-image version can be used with the adapter 300 to not only operate with misaligned shafts but to again reverse the rotational direction caused by the mirrored image version 200.

The operational principles of the above-described device are as follows. Torque is a function of pitch diameter while speed is a function of the number of teeth on meshing gears. The relationship between certain pitch diameters and tooth numbers on intermeshing gears are set forth in detail in U.S. Pat. No. 6,766,708 to Brooks, the specification of which incorporated herein by reference.

For example, the input ring gear will rotate at a predetermined speed according to the rotation of the input pinion gear and the primary drive shaft. Since the output ring gear is affixed to the same shaft as the input ring gear, they rotate at the same speed. The number of teeth and pitch diameter on the smaller output pinion gear can be designed such that the output pinion gear rotates at a faster speed than the input pinion gear. Similarly, the pitch diameter can be varied to minimize any torque losses resulting from the increase in speed. For example, an increase in curvature of the teeth on the input pinion and input ring gear cause each meshing tooth to contact each other for longer durations through a given rotation. If the output ring gear and output pinion teeth are shorter and fewer in number than the input gear teeth, they will engage each other for shorter durations, thereby increasing output shaft speed with minimal loss of torque. The device applies the principles of proportional engineering as opposed to linear engineering to achieve the results described herein.

The above-described device is not limited to the exact details of construction and enumeration of parts provided herein. For example, the pitch diameter, curvature, length and number of teeth on each gear can be varied to achieve a desired speed ratio/increase coupled with an acceptable but minimal torque loss. The gear ratios of the respective gears can be varied as desired according to input specifications and output requirements. The gears described above can be conventional or magnetic gears to eliminate friction and erosion of the mating surfaces of the engaging gears. Magnetic gears also facilitate modification of gear ratios with less labor and are resistant to overload. The device may also be used with primary transmissions, secondary transmissions, or both, Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A speed and torque optimizer for a drive train comprising:
    a hollow housing having at least one outer wall and an interior chamber;
    an input shaft operably connected to a first output shaft from an external rotary power source;
    an input pinion gear secured to said input shaft and received within said interior chamber, said input pinion gear having a predetermined number of arcuate teeth having a width, length and pitch diameter;
    a carrier shaft received within said interior chamber, said carrier shaft having a first end and a second end;
    an input ring gear attached to the first end of said carrier shaft and received within said interior chamber, said input ring gear having a predetermined diameter and plurality of arcuate teeth having a width, length and pitch diameter, the arcuate teeth on said input ring gear engaging and meshing with the arcuate teeth on said input pinion gear;
    an output ring gear attached to the second end of said carrier shaft and received within said interior chamber, said output ring gear having a predetermined number of arcuate teeth having a width, length and pitch diameter, said output ring gear having a smaller diameter than the predetermined diameter of the input ring gear;
    an output pinion gear received within said interior chamber and mounted on a second output shaft, said output pinion gear having a predetermined number of arcuate teeth having a width, length and pitch diameter, the arcuate teeth on said output ring gear engaging and meshing with the arcuate teeth on said output pinion gear, whereby the smaller diameter output ring gear causes the output pinion gear to rotate at a higher speed than the input pinion gear while the arcuate teeth on said output ring gear engaging and meshing with the arcuate teeth on said output pinion gear minimize torque losses;
    an intermediate shaft received within said carrier shaft;
    a first space formed between the first end of said carrier shaft and said intermediate shaft;
    a second space formed between said output pinion gear and said intermediate shaft;
    a pair of tapered bearings received within said first space and journaled between said carrier shaft and said intermediate shaft;
    a singular set of tapered bearings received within said second space and journaled between said output pinion gear and said intermediate shaft, whereby said pair of tapered bearings and said singular set of tapered bearings allow less spacing between the input ring gear and the output ring gear, create more surface contact between said pair of tapered bearings, said singular set of tapered bearings and said carrier shaft while reinforcing rigidity of said carrier shaft and said intermediate shaft to withstand thrust, axial, radial and inertia loads.

2. The speed and torque optimizer according to claim 1 further comprising an adapter including:
    an adapter housing;
    a second input shaft within said adapter housing and coupled with said second output shaft;
    an input adapter gear received within said adapter housing and mounted on said second input shaft;
    an output adapter gear received within said adapter housing and engaging said input adapter gear;
    a third output shaft attached to said output adapter gear, said second output shaft having a portion extending from said housing, said second output shaft rotating on a different rotational axis than said second input shaft to operably connect an offset input driver and an output driver.

3. The speed and torque optimizer according to claim 2 wherein the second input shaft and the third output shaft each rotate on bearings that maintain the second input shaft, the third output shaft, the input adapter gear and the output adapter gear in an operable position.

4. The speed and torque optimizer according to claim 1 wherein said intermediate shaft includes an integral flange on the second end, said flange fastened to said housing, whereby said pair of tapered bearings, said singular set of tapered bearings and said flange stabilize said carrier shaft to prevent wobbling, flexing and shifting.

5. The speed and torque optimizer according to claim 1 wherein said output pinion gear is partially protected within a casing, said casing having an opening proximal said output pinion gear that limits an amount of lubricant that contacts said output pinion gear to minimize lubricant foaming, to allow a nipple bearing to be installed within said casing to further stabilize the output pinion gear when exposed to torque, and which minimizes an amount of lubricant that must be stored within said housing.

6. The speed and torque optimizer according to claim 5 further comprising a pair of tapered bearings positioned between said casing and said input shaft.

7. The speed and torque optimizer according to claim 5 further comprising a pair of tapered bearings positioned between said casing and said second output shaft.

8. The speed and torque optimizer according to claim 5 further comprising lube seals positioned between a first section of said casing and a second section of said casing, and between said second section of said casing and said housing.

9. A speed and torque optimizer for a drive train comprising:
    a hollow housing having at least one outer wall and an interior chamber;
    an input shaft operably connected to a primary output shaft from an external rotary power source;
    an input pinion gear secured to said input shaft and received within said interior chamber, said input pinion gear having a predetermined number of arcuate teeth having a width, length and pitch diameter;
    a carrier shaft received within said interior chamber, said carrier shaft having a first end and a second end;
    an input ring gear attached to the first end of said carrier shaft and received within said interior chamber, said input ring gear having a predetermined diameter and plurality of arcuate teeth having a width, length and pitch diameter, the arcuate teeth on said input ring gear engaging and meshing with the arcuate teeth on said input pinion gear;

an output ring gear attached to the second end of said carrier shaft and received within said interior chamber, said output ring gear having a predetermined number of arcuate teeth having a width, length and pitch diameter, said output ring gear having a smaller diameter than the predetermined diameter of the input ring gear;

an output pinion gear received within said interior chamber and mounted on a second output shaft, said output pinion gear having a predetermined number of arcuate teeth having a width, length and pitch diameter, the arcuate teeth on said output ring gear engaging and meshing with the arcuate teeth on said output pinion gear, whereby the smaller diameter output ring gear causes the output pinion gear to rotate at a higher speed than the input pinion gear while the arcuate teeth on said output ring gear engaging and meshing with the arcuate teeth on said output pinion gear minimize torque losses;

an adapter housing;

a second input shaft within said adapter housing and coupled with said second output shaft;

an input adapter gear received within said adapter housing and mounted on said second input shaft;

an output adapter gear received within said adapter housing and engaging said input adapter gear;

a third output shaft attached to said output adapter gear, said second output shaft having a portion extending from said housing, said second output shaft rotating on a different rotational axis than said second input shaft to operably connect an offset input driver and an output driver.

10. The speed and torque optimizer according to claim 9 wherein the second input shaft and the third output shaft each rotate on bearings that maintain the second input shaft, the third output shaft, the input adapter gear and the output adapter gear in an operable position.

* * * * *